March 2, 1926.
H. C. BUNTING
1,575,536
INTERMITTENT ELECTRIC MAKE AND BREAK DEVICE
Filed April 16, 1923   2 Sheets-Sheet 1
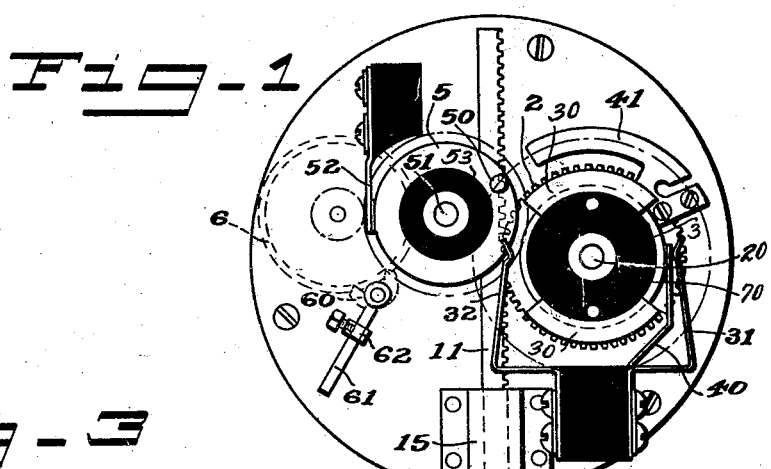
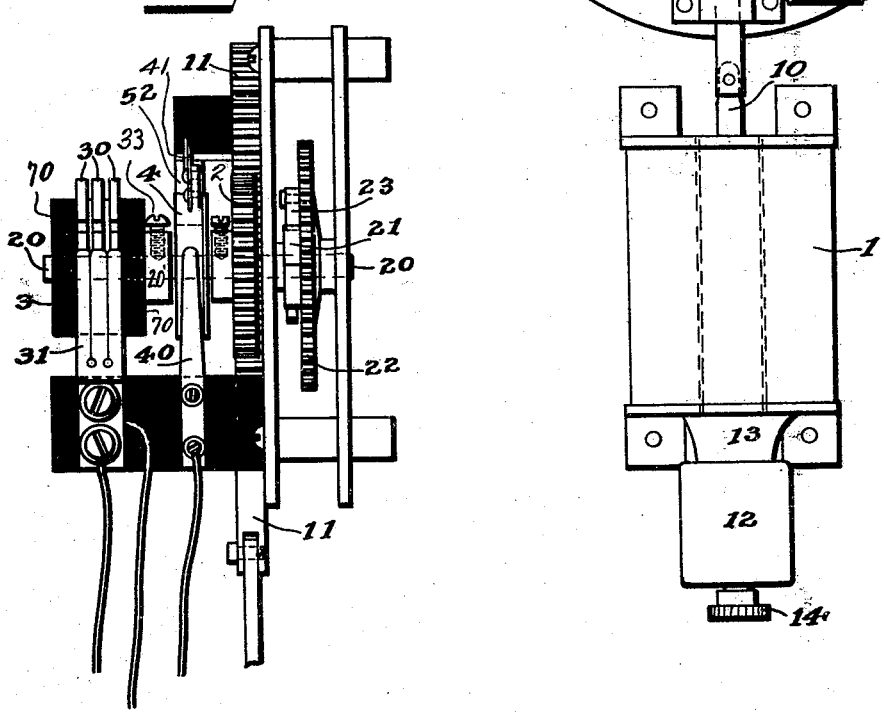
Inventor
Herbert C. Bunting
By H. L. & C. L. Reynolds.
Attorney March 2, 1926.  1,575,536
H. C. BUNTING
INTERMITTENT ELECTRIC MAKE AND BREAK DEVICE
Filed April 16, 1923    2 Sheets-Sheet 2
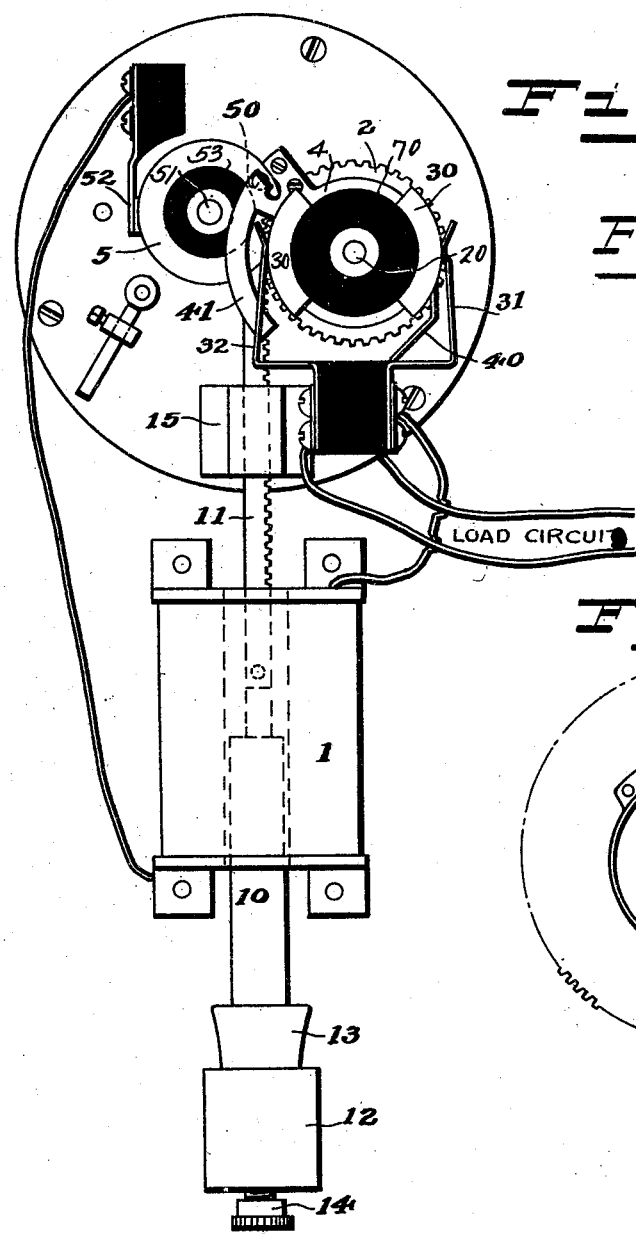
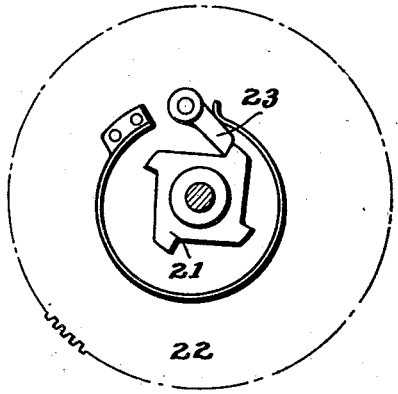
Inventor
Herbert C. Bunting
By H. L. & C. L. Reynolds.
Attorney Patented Mar. 2, 1926.

1,575,536

UNITED STATES PATENT OFFICE.

HERBERT C. BUNTING, OF SEATTLE, WASHINGTON.

INTERMITTENT ELECTRIC MAKE-AND-BREAK DEVICE.

Application filed April 16, 1923. Serial No. 632,574.

*To all whom it may concern:*

Be it known that I, HERBERT C. BUNTING, a citizen of the United States of America, and resident of the city of Seattle, in the county of King and State of Washington, have invented certain new and useful Improvements in Intermittent Electric Make-and-Break Devices, of which the following is a specification.

My invention relates to intermittent electric make-and-break devices or devices which are intended to control an electric current by producing intermittent makes-and-breaks therein. While the device has been designed for use as a flasher for the control of circuits in electric signs, it is capable of use for other purposes where intermittent make-and-break current is required.

The object of my invention is to provide a device for the purpose stated which will be simple and certain in its operation, and the construction of which is also cheap and durable.

Other objects of my invention may be seen from a study of the following description and the claims which terminate the same.

In the accompanying drawings I have show my invention embodied in the type of construction I now prefer to use.

Figure 1 is a face view of the device showing the position occupied by the parts upon the completion of the stroke which is caused by the direct action of the electrical motor.

Figure 2 is a face view of the same device showing the position of the parts on the completion of the return or gravity actuated stroke of the device.

Figure 3 is an edge view of the device, and Figure 4 illustrates the pawl and ratchet connection between the two shafts.

Figure 5 shows the adjustable contact segments and the manner of their mounting, the insulating sleeve being in section.

This device operates by the action of an electrical motor which is placed in a local controlling circuit and which by its movement controls a make-and-break device in a load circuit. By a load circuit is herein meant not only the circuit which may be used for operating lamps or motors, but a circuit which may be used for controlling switches for operating a power circuit. It is immaterial in my invention whether the circuit herein illustrated and referred to as a load circuit, be the uutimate load circuit or an intermediate circuit which controls an ultimate load circuit.

The type of electric motor which I prefer to use is that which consists of a solenoid. Such a motor is prompt in its action, has a reciprocating movement and is excellently adapted for the purpose.

In the drawings, 1 represents a solenoid coil and 10 the solenoid core. The solenoid is preferably placed with its axis in vertical position so that the return movement is caused by gravity and the weight of the core. It is, of course, obvious that the return movement may be caused by other means, as by the action of a spring which would enable the solenoid to be placed in other positions than with its axis vertical.

To the lower end of the solenoid core may be secured a weight, as 12, if such be needed to insure a prompt return movement of the solenoid core and there may also be secured thereto a buffer 13 which may be of any soft compressible material designed to take up the shock caused by the stoppage of the core in its upward or electrically actuated movement. The buffer 13 rests upon the weight 12 and the latter may be supported in adjusted position by means of a threaded bolt or screw 14. By adjusting this up or down, the exact termination of the upward stroke of the core may be controlled, and through this accurately control the operation of the other parts of the mechanism. The weight 12 may also be changed to secure the desired returning force.

The solenoid core is actuatively connected with the switch controlling means. The means for doing this illustrated consists of a bar 11 secured to the upper end of the solenoid core 10 and mounted to reciprocate within a guide or guides 15 and upon one face having a series of teeth cut to mesh with a gear 2 mounted to turn a shaft 20. The stroke of the solenoid core is regulated so as to give an exact and definite angle of turn to the gear 2. This may be varied in different apparatus and made as much as a complete turn, but in the apparatus herein illustrated this movement is approximately 90°. The angle of movement needed is determined by the gear ratio between parts of the device.

Secured upon and to turn with the shaft 20 are rotative contact members of two circuit controlling devices, one controlling the load circuit and the other controlling the circuit of the actuating motor, this being the solenoid as it has been illustrated. The rotative members of the load circuit controlling device has two circular segments 30, permanently in electrical connection with each other and insulated from the other parts of the device.

Preferably the segments 30 are made integral with the connecting ring 3. These are mounted upon an insulating sleeve 7 and the whole upon a metal sleeve 20' which is adjustably secured upon the shaft 20 as by a set screw 4. Insulating disks 70 are placed at each side of the device.

Segments 30 cooperate with brushes 31 and 32 to make-and-break the load circuit. Said brushes 31 and 32 are connected with suitable leads from the load circuit. The disk 4 which lies back of the disk 3 in the device as shown in Figures 1 and 2, has a brush or spring finger 40 contacting therewith and forming a part of the solenoid actuating circuit. This disk also carries a spring arm 41 which is of arcuate character and co-operates with a complemental contact member, herein shown as the pin 50, which pin is mounted upon a disk 5 and turns about the shaft 51. A brush as 52 contacts with the disk 5 and is inserted in the solenoid circuit.

In the position shown in Figure 2, wherein the pin 50 is in engagement with one end of the arcuate bar 41, the solenoid circuit is closed. In this situation the solenoid core will be rapidly drawn upward. This movement, by reason of the connection between the rack bar 11 and the gear 2, the latter secured to the shaft 20, will cause a right-handed or clockwise turning of the shaft 20 and the members carried thereby, the latter including the arcuate bar 41. This will continue without breaking the solenoid circuit until the arcuate bar 41 passes the pin 50. When this happens there is sufficient momentum in the solenoid core to carry it somewhat beyond the point of breaking contact, or say to a position similar to that shown in Figure 1. The buffer 13 at this time will have struck the lower end of the solenoid core and a prompt downward movement of the solenoid core will commence. As this happens the shaft 20 and the parts carried thereby will be turned left-handedly, or in an anti-clockwise direction.

The shaft 20 has secured thereon a ratchet wheel 21 which as herein shown has four teeth. The number of teeth is determined by the required angular movement of the shaft at each impulse. As this in the machine illustrated is 90°, the wheel 21 has four teeth.

Mounted loosely upon the shaft 20 is a gear 22 which meshes with a pinion carried by the shaft 51. The gear ratio here is such that the shaft 51 is given a complete rotative movement for a 90° angular movement of the gear 22 and shaft 20. As the disk 5 which carries the contact member 50 complemental to the bar 41 is secured to the shaft 51, the contact pin 50 is given a complete or 360° turning movement at each stroke of the solenoid core. As the gear 22 is turned from the ratchet wheel 21 through a spring-held pawl 23, the disk 5 has no movement during the oscillation of the shaft 20 in one direction. This corresponds with the upward movement of the solenoid core. When this occurs the ratchet wheel 21 is moved backward so as to engage the pawl 23 by the next tooth.

When the downward movement of the solenoid core commences the shaft 51 with its disk is turned. This gives said shaft and disk an intermittent movement in a continuously forward direction, which direction in the device illustrated is in the same direction as the movement of the hands of a clock.

As the movement of the contact member consisting of the pin 50 is faster than that of the arcuate bar 41 forming the complemental contact member, they will not be brought into contact by this movement until the bar 41 has reached its lowermost position and the pin 50 swings under the same from its side, or with the position of the parts as shown in Figure 2. When this occurs the solenoid circuit is closed and the core makes an upward stroke. This action will be repeated so long as the current is on this circuit.

The arcuate conductors 30, 30 which function with the brushes 31 and 32 to make and break the load circuit, should be adjustable in angular position upon the shaft 20. A simple means for doing this has been shown, this consisting of the set screw 4 by which the segments 30 may be fixed in angular position upon the shaft.

It is evident that if in the position of normal rest, or that shown in Figure 2, and with segments 30 turned right handedly, that is, in a clockwise direction, the length of time during which the load circuit will be closed, depends upon the arc of the segments 30, 30 with which the brushes 31, 32 contact. If these segments 30, 30 are angularly adjusted so that their entire length contacts with the brushes 31, 32, the load circuit is, or may be, closed during a large per cent of the time. If, however, the segments 30 are adjusted so that a very small portion of their length contact with the brushes 31, 32, the load circuit is closed only a small part of the time. This relation may be better understood if it be remembered that the angular movement of the disk 3 is, in the device illustrated, 90° and the angular extent of the segments 30 is also 90°. In the adjustment illustrated, the arc of contact of segments 30 with the brushes is approximately 45°, which would make the open and closed periods much shorter than if their entire length contacted with the brushes 31, 32.

In the frame of the device I provide a retarding mechanism or something to delay the rapidity of the return movement. This as illustrated consists of a gear train having a toothed wheel 6 having operating thereon an escapement 60, which escapement has an arm 61 secured to its shaft and provided with an adjustable weight 62, by the adjustment of which the rate of operation may be controlled.

What I claim as my invention is:

1. In a device for intermittently making and breaking an electric circuit, an oscillating member and a rotating member carrying complemental make-and-break contacts, a solenoid having said make-and-break contacts in its exciting circuit, and a make-and-break device for the load circuit carried by said oscillating member.

2. In a device for intermittently making and breaking an electric circuit, a solenoid having a member reciprocated by the inductive action of the current therein, a shaft oscillated by the movement of the reciprocable member of the solenoid, a make-and-break device for the load circuit operated by the oscillations of said shaft, a contact disk for the solenoid exciting circuit carried by said shaft, a rotative shaft and a delaying mechanism connected therewith, complemental contact members in the solenoid exciting circuit, one carried by the rotative shaft and the other by the oscillated shaft, the solenoid-moved one of said contact members being proportioned to be carried beyond the other by the current actuated movement of the solenoid.

3. A make-and-break mechanism for electric circuits comprising a solenoid having a reciprocating member, a rotative and an oscillating shaft, complemental contact members in the solenoid exciting circuit and actuated each by its respective shaft, one comprising a face-projecting member of limited area and the other an arcuate member, one of said contact members being moved by the inductively excited movement of the solenoid to carry the two out of engagement, and the other by the gravity actuated movement of the movable solenoid member.

4. A make-and-break device comprising a rotative and an oscillating member, one carrying a face-projecting contact and the other an arcuate complemental contact, a solenoid having a reciprocative member, means connecting said reciprocative member with said contact members to operate them alternately by the opposite movements thereof and a circuit including the solenoid coil and said contact members.

5. An electric make-and-break device comprising an arcuate contact bar and a complemental contact pin, said bar and pin being pivoted to move in intersecting circular paths about separated axes, and electrically actuated means in circuit with said contact members for swinging one of said contact members out of contact with the other.

6. An electric make-and-break device comprising an arcuate contact bar and a complemental contact pin, said bar and pin being pivoted to move in intersecting circular paths about separated axes, a solenoid having a reciprocable core, said core having an actuating connection with one of said contact members adapted to turn it in one direction only, and an actuating connection with the other member adapted to oscillate it, whereby contact between the two members is broken by the electrically energized movement of the solenoid and both are moved to position of rest and contact on the gravity energized movement of the solenoid.

7. In a make-and-break device for electric circuits, a disk and complemental contact members therefor secured in a control circuit, one of said contact members being movable in a cycle, a second disk secureable to turn with the first disk and adjustable to vary the angular relation between the two, contact members for said second disk connected in the load circuit, an electrically energized means connected in the control circuit and means connecting it with both of said disks to oscillate them and with the cyclically movable contact member to move it through its cycle while the disks are moving in one direction.

8. In a make-and-break-device, two rotatively mounted complemental contact members, an actuating device for said contact members comprising a device electrically energized for movement in one direction and independent means for moving it in the return direction, said contact members being in the energizing circuit of their actuating device, means connecting the actuating device with one of the contact members to oscillate it and with the other contact member to give it intermittent forward movement.

9. An electric make-and-break device comprising an arcuate bar and a complemental contact pin, both mounted for separate circular movements which brings them into contact at a fixed point, an electrically actuated device having actuating connection with one of said contact members to give it an oscillating movement.

Signed at Seattle, King County, Washington this 7th day of April 1923.

HERBERT C. BUNTING.